(12) United States Patent
Huang

(10) Patent No.: US 10,742,693 B2
(45) Date of Patent: Aug. 11, 2020

(54) METHOD AND SYSTEM FOR WRITING TRAJECTORY SYNCHRONIZATION AMONG MULTIPLE CLIENTS

(71) Applicant: GUANGZHOU SHIRUI ELECTRONICS CO. LTD., Guangzhou (CN)

(72) Inventor: Baohua Huang, Guangzhou (CN)

(73) Assignee: GUANGZHOU SHIRUI ELECTRONICS CO. LTD., Guangzhou (CN)

(*) Notice: Subject to any disclaimer, the term of this patent is extended or adjusted under 35 U.S.C. 154(b) by 34 days.

(21) Appl. No.: 16/094,166

(22) PCT Filed: Dec. 29, 2016

(86) PCT No.: PCT/CN2016/113210
§ 371 (c)(1),
(2) Date: Oct. 16, 2018

(87) PCT Pub. No.: WO2017/181725
PCT Pub. Date: Oct. 26, 2017

(65) Prior Publication Data
US 2019/0141098 A1    May 9, 2019

(30) Foreign Application Priority Data
Apr. 19, 2016 (CN) .......................... 2016 1 0246833

(51) Int. Cl.
| | | |
|---|---|---|
| *G06F 15/16* | (2006.01) | |
| *H04L 29/06* | (2006.01) | |
| *G06F 3/14* | (2006.01) | |
| *G06F 3/0488* | (2013.01) | |
| *G06K 9/00* | (2006.01) | |
| *G09B 5/10* | (2006.01) | |
| *H04L 29/08* | (2006.01) | |

(52) U.S. Cl.
CPC ...... *H04L 65/4015* (2013.01); *G06F 3/04883* (2013.01); *G06F 3/1454* (2013.01);
(Continued)

(58) Field of Classification Search
CPC .............. H04L 65/4015; H04L 65/605; H04L 67/1095; H04L 67/42; G06F 3/04883;
(Continued)

(56) References Cited

U.S. PATENT DOCUMENTS 5,940,082 A * 8/1999 Brinegar ............... G06Q 10/107
345/442
6,388,654 B1 * 5/2002 Platzker .................. G06F 3/033
345/1.2
(Continued)

FOREIGN PATENT DOCUMENTS

| CN | 103744555 A | 4/2014 |
|---|---|---|
| CN | 104106037 A | 10/2014 |

(Continued)

OTHER PUBLICATIONS

Chinese Office Action received in 201610246833.5, pp. 18.
(Continued)

*Primary Examiner* — Philip B Tran
(74) *Attorney, Agent, or Firm* — Zhong Law, LLC

(57) ABSTRACT

A method and system for writing trajectory synchronization among multiple clients are disclosed. The method includes: receiving (S10) segmented writing trajectory data of a real-time writing trajectory transmitted in segments by each transmitting end; forwarding (S20) each segment of the segmented writing trajectory data to each receiving end in real time respectively, where the segmented writing trajectory data is received asynchronously and restored into a real-time writing trajectory by each receiving end; receiving (S30) complete writing trajectory data of a complete writing input transmitted by each transmitting end; and forwarding (S40) the complete writing trajectory data transmitted by each transmitting end to each receiving end, where the complete writing trajectory data is received synchronously and inserted into an interface for display by each receiving
(Continued)

end. The method improves efficiency of writing trajectory synchronization for multiple clients while ensuring the display of writing trajectory, thereby enhancing user experience.

18 Claims, 4 Drawing Sheets

(52) U.S. Cl.
CPC ..... *G06K 9/00409* (2013.01); *G06K 9/00979* (2013.01); *G09B 5/10* (2013.01); *H04L 65/605* (2013.01); *H04L 67/1095* (2013.01); *H04L 67/42* (2013.01)

(58) Field of Classification Search
CPC .............. G06F 3/1454; G06K 9/00409; G06K 9/00979; G09B 5/10
See application file for complete search history.

(56) References Cited

U.S. PATENT DOCUMENTS

| | | | | |
|---|---|---|---|---|
| 2005/0015250 | A1* | 1/2005 | Davis | G10L 15/24 704/231 |
| 2007/0020604 | A1* | 1/2007 | Chulet | G09B 5/06 434/350 |
| 2012/0229425 | A1* | 9/2012 | Barrus | G06F 3/04883 345/179 |
| 2014/0204036 | A1* | 7/2014 | Schillings | G06F 3/04883 345/173 |
| 2015/0002435 | A1 | 1/2015 | Shimizu et al. | |
| 2015/0104778 | A1* | 4/2015 | Liu | G09B 7/04 434/335 |

FOREIGN PATENT DOCUMENTS

| | | |
|---|---|---|
| CN | 104133630 A | 11/2014 |
| CN | 104915100 A | 9/2015 |
| CN | 105930121 A | 9/2016 |
| JP | 2002077858 A | 3/2002 |

OTHER PUBLICATIONS

The Design and Implementation of Interactive Experience in New Ageneration Teleconference System, M.E. Dissertation, Beijing University of Technology, dated Mar. 15, 2016, pp. 102.

International Search Report and Written Opinion received in PCT/CN16/113210 dated Apr. 7, 2014, pp. 10.

European Application No. 16899304.6, Extended European Search Report dated Mar. 22, 2019.

\* cited by examiner

METHOD AND SYSTEM FOR WRITING TRAJECTORY SYNCHRONIZATION AMONG MULTIPLE CLIENTS

CROSS-REFERENCE TO RELATED APPLICATIONS

This application claims priority to International Patent Application No. PCT/CN2016/113210 filed Dec. 29, 2016, which claims priority to Chinese application No. CN 201610246833.5, filed Apr. 19, 2016, the contents of which are hereby incorporated by reference as though fully set forth herein.

TECHNICAL FIELD

The present invention relates to the technical field of computer application software technology and, in particular, to a method and a system for synchronizing the writing trajectory among multiple clients.

BACKGROUND

With increasing popularity of intelligent electronic devices in everyday life, intelligent tablet plays a significant role in various fields. For example, in the field of distance education, multiple intelligent tablets are interconnected over a network to obtain a face-to-face communication. Through a client of the intelligent tablet, a user may communicate writing trajectory with other clients through a server, thereby achieving a real-time synchronization of writing trajectory and a presentation of writing contents.

Currently, there are two approaches generally used in the conventional multiple client synchronization of writing trajectory. One approach is to transmit a writing trajectory to a server by a client of a transmitting end, and after each client finishing its trajectory writing, the server performs synchronization and then forwards the writing trajectory to an interface of a client of a receiving end for restoration. This approach requires writing trajectory of each client to be completed before synchronization, resulting in poor real-time performance. The other approach is to transmit segments of the writing trajectory, over several times, to a server by a client while a writing trajectory is written by each client, where a small segment of writing trajectory is transmitted each time, and the server forwards the segment of the writing trajectory to an interface of a client of a receiving end for restoration after each segment of the writing trajectory has been synchronized by the server. The server achieves synchronization of writing trajectory in a manner of "record-synchronize-record-synchronize." In this way, the real-time performance is improved to some degree; however, when there are too many writing trajectories being written at a same time, this segmented synchronization would affect the efficiency of synchronization, and can easily lead to a loss of data, which is hard to be recovered.

In summary, conventional solutions have the problem of low synchronizing efficiency when performing writing trajectory synchronization for multiple clients.

SUMMARY

Accordingly, it is necessary to provide a method and system for synchronizing writing trajectory among multiple clients to address the problem of low synchronizing efficiency when performing writing trajectory synchronization for multiple clients in a conventional way.

A method for writing trajectory synchronization among multiple clients, includes the steps of:
receiving segmented trajectory data of a real-time writing trajectory transmitted in segments by each transmitting end;
forwarding each segment of the segmented trajectory data to respective each receiving end in real time, wherein the segmented trajectory data is received asynchronously and restored into a real-time writing trajectory by each receiving end;
receiving complete trajectory data of a single complete writing input transmitted by each transmitting end; and
forwarding the complete trajectory data transmitted by each transmitting end to each receiving end, wherein the complete trajectory data is received synchronously and inserted into an interface for display by each receiving end.

A system for writing trajectory synchronization among multiple clients, includes:
a segment receiving module to receive segmented trajectory data of a real-time writing trajectory transmitted in segments by each transmitting end;
an asynchronous forwarding module to forward respective each segment of the segmented trajectory data to each receiving end in real time, wherein the segmented trajectory data is received asynchronously and restored into a real-time writing trajectory by each receiving end;
a complete receiving module to receive complete trajectory data of a single complete writing input transmitted by each transmitting end; and
a synchronous forwarding module to forward the complete trajectory data transmitted by each transmitting end to each receiving end, wherein the complete trajectory data is received synchronously and inserted into an interface for display by each receiving end.

During a writing process, according to the foregoing method and system for writing trajectory synchronization of multiple clients, segmented trajectory data of each transmitting end is forwarded to each receiving end in real time respectively, for the receiving end to receive and then restore it into a real-time writing trajectory, thereby improving the efficiency of synchronizing writing trajectory. After a complete writing, complete trajectory data of each transmitting end is forwarded to each receiving end, for the receiving end to receive synchronously and insert into an interface for display, which ensures displaying effect of writing trajectory. This solution improves efficiency of writing trajectory synchronization for multiple clients while ensuring the display of writing trajectory, thereby enhancing user experience.

DESCRIPTION OF EMBODIMENTS

Detailed description of technical solution of the present invention will be set forth in conjunction with the accompanying drawings.

The "transmitting end" or "receiving end" in the present invention may include a client running on an intelligent terminal such as an intelligent tablet and the like. A user may log in to a server through the client, perform information interaction with the server via the transmitting end during a writing process, and perform information interaction with the server via the receiving end when receiving a writing trajectory. For each transmitting end, the receiving end refers to any other client except for itself.

Figure 1:
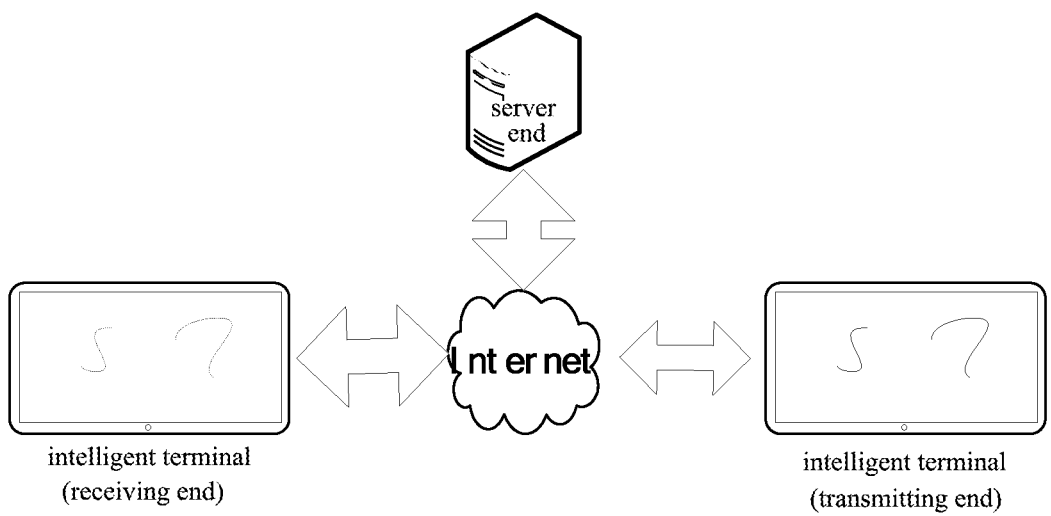
FIG. 1 is a schematic network diagram for implementing a method for writing trajectory synchronization of multiple clients according to an embodiment.

Referring to FIG. 1, FIG. 1 is a schematic network diagram for implementing a method for writing trajectory synchronization among multiple clients according to an embodiment, where a plurality of intelligent terminals are interconnected over a network (e.g. the Internet), such that a writing trajectory written on any intelligent terminal can be synchronized to each intelligent terminal (left of the figure).

Figure 2:
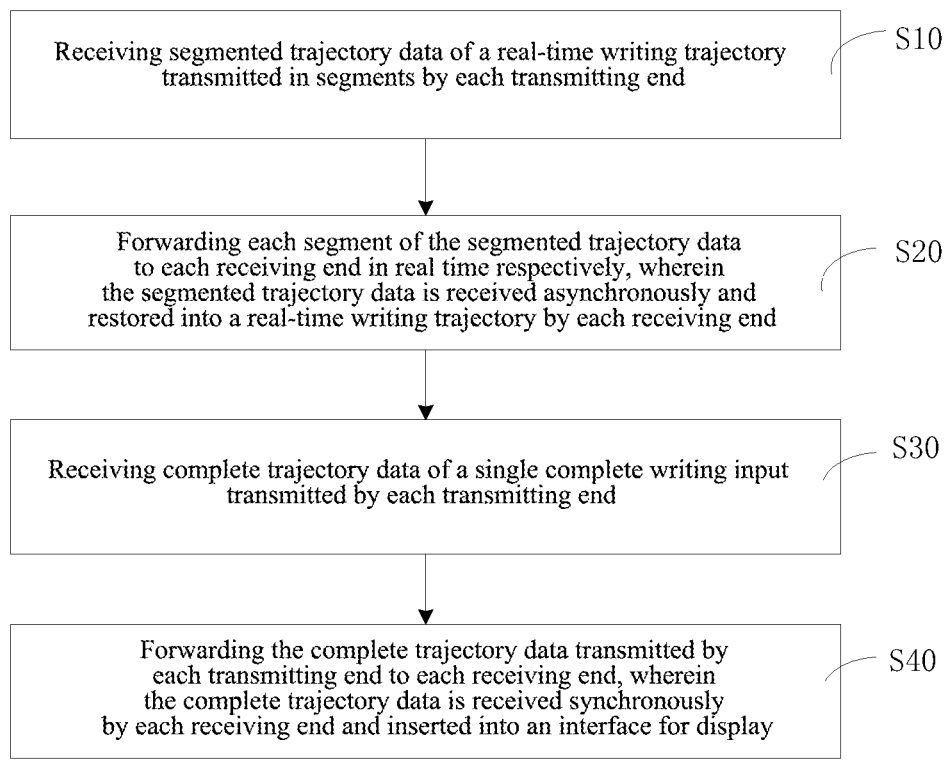
FIG. 2 is a flowchart of a method for writing trajectory synchronization among multiple clients according to an embodiment.

Referring to FIG. 2, FIG. 2 is a flowchart of a method for writing trajectory synchronization of multiple clients. The method may be applied on a server end, and includes the steps of:

S10, receiving segmented trajectory data of a real-time writing trajectory transmitted in segments by each transmitting end.

In this step, a real-time writing trajectory input by a user is transmitted by each transmitting end, where a transmitting end transmits in a segment-wise manner, a small segment of writing trajectory is transmitted each time, and these segmented trajectory data are received by a server end in real time, where trajectory data mainly records location information and property information of a trajectory point.

In an embodiment, the transmitting end obtains an input point of a writing trajectory of the user, and forms a set of input points from a plurality of consecutive input points to obtain segmented trajectory data; where an input mode of writing trajectory may include mouse input, touch input, body sensation input, optical input and the like.

In an embodiment, the transmitting end may set an identification information for the set of input points of the writing trajectory of the user, and form one or more segments of writing trajectory data segment based on the identification information; where the identification information includes ID (identification) of a user and ID of a set of points, where the ID of a user is for identifying a user by whom a writing trajectory is written, and the ID of a set of points is for identifying a writing trajectory.

In an embodiment, when a plurality of writing trajectories are being written on a transmitting end in real time, the transmitting end may transmit the segmented trajectory data of each writing trajectory at a preset frequency. For example, the transmitting end may send the trajectory data to the server end at a frequency of 20 times per second. Further, transmission performance of the transmitting end may be detected. When the transmission performance is deteriorated, the transmission frequency is reduced, and when the performance improves, the transmission frequency is restored to the preset frequency.

In the above embodiments, a real-time writing process is being synchronized, while a writing trajectory data is not inserted into an interface, thus allowing an adjustment of data transmission frequency according to the performance, thereby ensuring the effect of synchronous writing.

S20, forwarding each segment of the segmented trajectory data to respective each receiving end in real time, where the segmented trajectory data is received asynchronously and restored into a real-time writing trajectory by each receiving end.

In this step, the server end forwards the segmented trajectory data to each receiving end upon receiving it, where the segmented trajectory data is received asynchronously and restored into a real-time writing trajectory by each receiving end. Since writing process of trajectory is synchronized in a manner of asynchronous reception, it is unnecessary to wait for a synchronizing process at the server end, and the trajectory data is not inserted into an interface, thereby improving the efficiency of synchronization and preventing system congestion.

In an embodiment, the receiving end restores one or more segments of segmented trajectory data into a real-time trajectory input by the user according to the identification information.

In an embodiment, when forwarding each segment of the segmented trajectory data to each receiving end in real time, a segment of the segmented trajectory data is discarded if the segment is failed to be forwarded.

According to above embodiment, during the process of forwarding the trajectory data, the segmented trajectory data is discarded when forwarding fails. Although some data may be lost, efficiency of a real-time writing is ensured.

S30, receiving complete trajectory data of a single complete writing input transmitted by each transmitting end.

In this step, each transmitting end transmits a complete writing trajectory input by the user, and the server end synchronizes the complete writing trajectory transmitted by each transmitting end, ensuring the security and integrity of writing.

S40, forwarding the complete trajectory data transmitted by each transmitting end to each receiving end, where the complete trajectory data is received synchronously and inserted into an interface for display by each receiving end.

In this step, after synchronizing the complete trajectory data from each transmitting end, the server end forwards the complete trajectory data to each receiving end that receives the complete trajectory data synchronously, processes the complete trajectory data, and inserts the complete trajectory data into an interface for display.

Further, while forwarding the complete trajectory data, the server records the complete trajectory data each time forwarding a complete writing input to each transmitting end, and transmits the complete trajectory data to a newly added receiving end to insert the complete trajectory data into an interface for display.

According to the embodiment, the effect of a final writing trajectory can be ensured, and for the newly added receiving end, the effect of writing trajectory of the entire writing process may be obtained.

Figure 3:
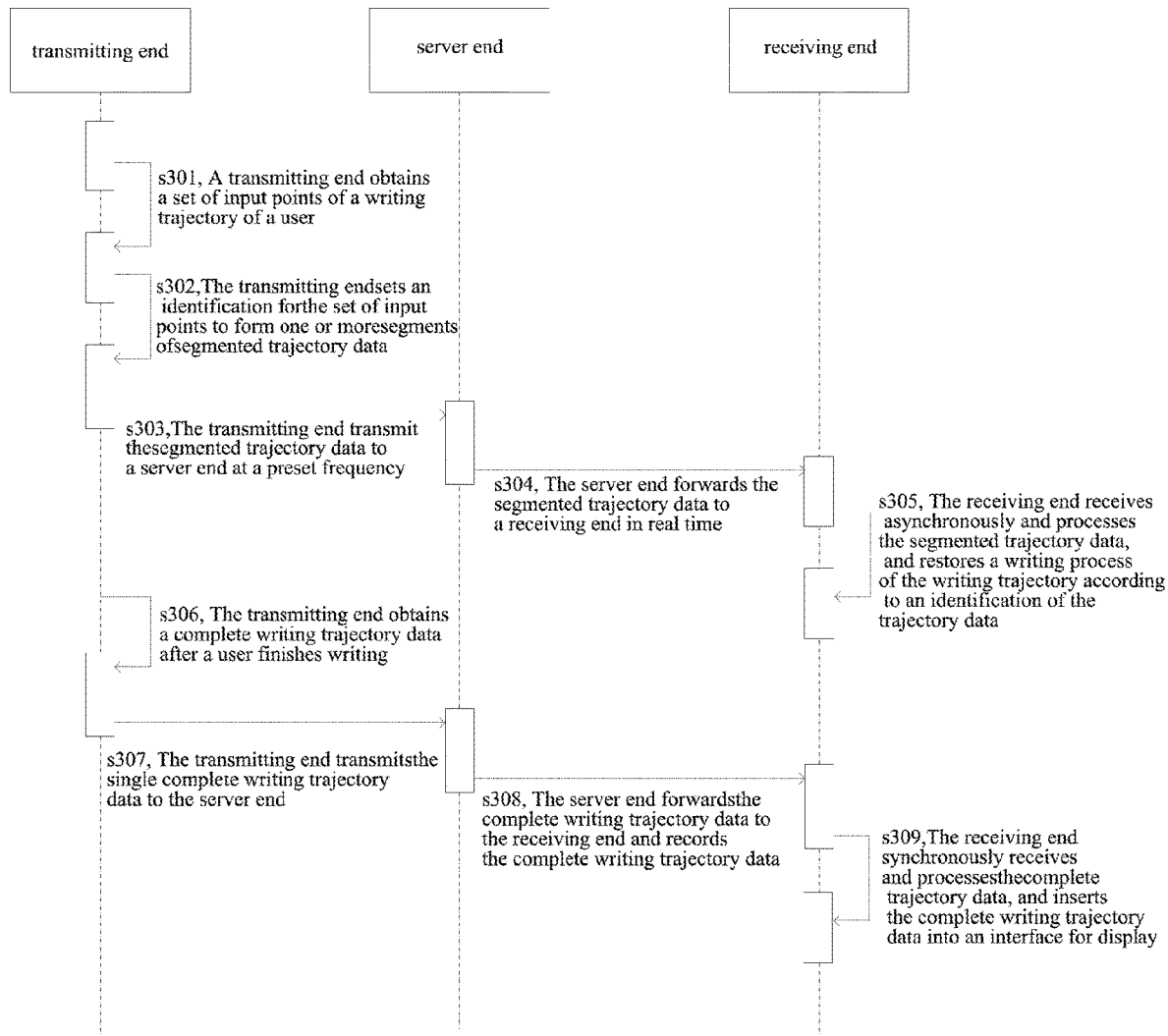
FIG. 3 is a flowchart of synchronous interaction of writing trajectory according to an embodiment.

For a thorough understanding of a method for writing trajectory synchronization of multiple clients according to the present invention, descriptions are set forth in conjunction with an application example. Referring to FIG. 3, which is a flowchart of synchronous interaction of writing trajectory, where a transmitting end and a receiving end interact with a server end via a network, specifically the flow includes the steps of:

s301, A transmitting end captures a set of input points of a writing trajectory of a user;

s302, The transmitting end sets an identification for the set of input points to form one or more segments of segmented trajectory data;

s303, The transmitting end transmits the segmented trajectory data to a server end at a preset frequency;

s304, The server end forwards the segmented trajectory data to a receiving end in real time, where data loss is allowable during the forwarding process;

s305, The receiving end receives asynchronously and processes the segmented trajectory data, and restores a writing process of the writing trajectory according to an identification of the trajectory data;

s306, The transmitting end obtains a complete writing trajectory data after a user finishes a writing;

s307, The transmitting end transmits the single complete writing trajectory data to the server end;

s308, The server end forwards the complete writing trajectory data to the receiving end and records the complete writing trajectory data;

s309, The receiving end synchronously receives and processes the complete writing trajectory data, and inserts the complete writing trajectory data into an interface for display.

According to the above technical solution, a plurality of users may log in to a server end, and the plurality of users perform writing on an intelligent terminal, a transmitting end transmits a writing trajectory in real time, a receiving end connected to the server end synchronizes a writing process in real time, and receives and displays a complete writing trajectory after each time a writing is finished.

Figure 4:
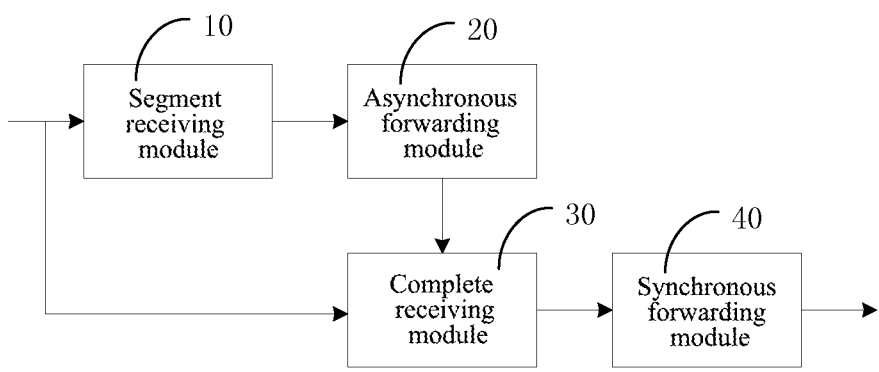
FIG. 4 is a schematic diagram of a system for writing trajectory synchronization of multiple clients according to an embodiment.

Referring to FIG. 4, FIG. 4 is a schematic diagram of a system for writing trajectory synchronization of multiple clients. The system may be implemented on a server end, including:

a segment receiving module 10 to receive segmented trajectory data of a real-time writing trajectory transmitted in segments by each transmitting end;

an asynchronous forwarding module 20 to forward each segment of the segmented trajectory data to each receiving end in real time respectively, where the segmented trajectory data is received and restored into a real-time writing trajectory asynchronously by each receiving end;

a complete receiving module 30 to receive complete trajectory data of a single complete writing input transmitted by each transmitting end; and a synchronous forwarding module 40 to forward the complete trajectory data transmitted by each transmitting end to each receiving end, where the complete trajectory data is received synchronously and inserted into an interface for display by each receiving end.

In an embodiment, the transmitting end captures an input point of a writing trajectory of a user, and forms a set of input points from a plurality of consecutive input points to obtain segmented trajectory data; where an input mode of the writing trajectory may include mouse input, touch input, body sensation input, optical input and the like.

In an embodiment, an identification information is set for a set of input points of a writing trajectory of a user by the transmitting end, and one or more segments of writing trajectory data segment are formed based on the identification information; where the identification information includes ID (identification) of a user and ID of a set of points.

In an embodiment, when a plurality of writing trajectories are being written on a transmitting end in real time, segmented trajectory data of each writing trajectory transmitted at a preset frequency by a transmitting end, is received. For example, the transmitting end may transmit the writing trajectory data to the server end at a frequency of 20 times per second. Further, transmission performance of a transmitting end may be detected. When the transmission performance is deteriorated, the transmission frequency is reduced; when the performance gets better, the transmission frequency is restored to the preset frequency.

In the above embodiments, a real-time writing process is being synchronized, while a writing trajectory data is not inserted into an interface, thus allowing an adjustment of data transmission frequency according to the performance, thereby ensuring the effect of synchronous writing.

In an embodiment, the receiving end restores one or more segments of segmented writing trajectory data into a real-time writing trajectory input by the user according to the identification information.

In an embodiment, when the asynchronous forwarding module 20 forwards each segment of the segmented trajectory data to each receiving end in real time, a segment of the segmented trajectory data is discarded when it is failed to be forwarded.

According to the above embodiment, during the process of forwarding the trajectory data, the trajectory data is discarded when the forwarding failed. Although some data may be lost, efficiency of a real-time writing is ensured.

In an embodiment, when forwarding the complete trajectory data, the complete receiving module 30 further records the complete writing trajectory data each time of a complete writing input of each transmitting end, and the complete trajectory data is transmitted to a newly added receiving end to insert the complete trajectory data into an interface for display.

According to the solution of the above embodiment, the effect of a final writing trajectory can be ensured, and for the newly added receiving end, the effect of writing trajectory of the entire writing process may be obtained.

The method for writing trajectory synchronization of multiple clients according to the present invention corresponds to the system for writing trajectory synchronization of multiple clients according to the present invention, thus it should be noted that the technical features and advantages thereof as set forth in embodiments of the method for writing trajectory synchronization of multiple clients are applicable to embodiments of the system for writing trajectory synchronization of multiple clients.

Technical features of the above embodiments may be combined in any combination. For the purpose of simplicity, not all possible combinations of each technical feature of the above embodiments is described; however, combination of these features should be considered to be within the scope of the present specification as long as no contradiction arises.

The discussion of the above embodiments is merely for illustrating several implementations in detailed and specific description of the present invention, but is not intended to be construed in a limiting sense. It should be noted that, for those skilled in the art, various variations and modifications may be made without departing from the spirit of the present invention, which fall within the scope of the present invention. Therefore, the scope of the present invention should be subject to the appended claims.

What is claimed is:

1. A method for writing trajectory synchronization among multiple clients, comprising:

receiving segmented writing trajectory data of a real-time writing trajectory transmitted in segments by each transmitting end;

forwarding each segment of the segmented writing trajectory data to respective each receiving end in real time, wherein each receiving end receives the segmented writing trajectory data asynchronously and restores the segmented writing trajectory data into the real-time writing trajectory;

receiving complete writing trajectory data associated with a single complete writing input transmitted by each transmitting end; and forwarding the complete writing trajectory data transmitted by each transmitting end to each receiving end, wherein each receiving end receives the complete writing trajectory data synchronously and inserts the single complete writing input into an interface for display.

2. The method for writing trajectory synchronization among multiple clients according to claim 1, wherein the transmitting end captures an input point of a writing trajectory of a user, and forms a set of input points from a plurality of consecutive input points to obtain the segmented writing trajectory data.

3. The method for writing trajectory synchronization among multiple clients according to claim 2, wherein an input mode of the writing trajectory comprises at least one of mouse input, touch input, body sensation input, or optical input.

4. The method for writing trajectory synchronization among multiple clients according to claim 2, wherein the transmitting end sets identification information for the set of input points of the writing trajectory of the user, wherein one or more segments of the segmented writing trajectory data are formed according to the identification information; and
the receiving end restores the one or more segments of the segmented writing trajectory data into the real-time writing trajectory input by the user according to the identification information.

5. The method for writing trajectory synchronization among multiple clients according to claim 4, wherein the identification information comprises an ID of the user and an ID of the set of input points.

6. The method for writing trajectory synchronization among multiple clients according to claim 2, comprising receiving, when a plurality of writing trajectories are being written on a transmitting end in real time, the segmented writing trajectory data of each writing trajectory transmitted by the transmitting end at a preset frequency.

7. The method for writing trajectory synchronization among multiple clients according to claim 6, further comprising:
detecting transmission performance of the transmitting end;
reducing transmission frequency responsive to detecting that the transmission performance is deteriorated; and
restoring transmission frequency to a preset frequency responsive to detecting that the performance improves.

8. The method for writing trajectory synchronization among multiple clients according to claim 1, further comprising, when forwarding each segmented writing trajectory data to each receiving end in real time, discarding the segmented writing trajectory data if the forwarding of the segmented writing trajectory data fails.

9. The method for writing trajectory synchronization among multiple clients according to claim 1, further comprising:
recording the complete writing trajectory data associated with the single complete writing input captured at each transmitting end, and transmitting the complete writing trajectory data to a newly added receiving end to insert the single complete writing input into the interface for display.

10. A system for writing trajectory synchronization among multiple clients, comprising a computer processor to:
receive segmented writing trajectory data of a real-time writing trajectory transmitted in segments by each transmitting end;
forward each segment of the segmented writing trajectory data to respective each receiving end in real time, wherein each receiving end receives the segmented writing trajectory data asynchronously and restores segmented writing trajectory into the real-time writing trajectory;
receive complete writing trajectory data associated with a single complete writing input transmitted by each transmitting end; and
forward the complete writing trajectory data transmitted by each transmitting end to each receiving end, wherein each receiving end receives the complete writing trajectory data synchronously and inserts the single complete writing input into an interface for display.

11. The system for writing trajectory synchronization among multiple clients according to claim 10, wherein the transmitting end captures an input point of a writing trajectory of a user, and forms a set of input points from a plurality of consecutive input points to obtain the segmented writing trajectory data.

12. The system for writing trajectory synchronization among multiple clients according to claim 11, wherein an input mode of the writing trajectory comprises at least one of mouse input, touch input, body sensation input, or optical input.

13. The system for writing trajectory synchronization among multiple clients according to claim 11, wherein the transmitting end sets identification information for the set of input points of the writing trajectory of the user, wherein one or more segments of the segmented writing trajectory data are formed according to the identification information; and
the receiving end restores the one or more segments of the segmented writing trajectory data into the real-time writing trajectory input by the user according to the identification information.

14. The system for writing trajectory synchronization among multiple clients according to claim 13, wherein the identification information comprises an ID of the user and an ID of the set of input points.

15. The system for writing trajectory synchronization among multiple clients according to claim 11, wherein, when a plurality of writing trajectories are being written on a transmitting end in real time, the computer processor is further to receive the segmented writing trajectory data of each writing trajectory transmitted by the transmitting end at a preset frequency.

16. The system for writing trajectory synchronization among multiple clients according to claim 15, wherein the computer processor is further to:
detect transmission performance of the transmitting end;
reduce transmission frequency responsive to detecting that the transmission performance is deteriorated; and
restore transmission frequency to a preset frequency responsive to detecting that the performance improves.

17. The system for writing trajectory synchronization among multiple clients according to claim 10, wherein, when forwarding each segmented writing trajectory data to each receiving end in real time, the computer processor is further to discard the segmented writing trajectory data if the forwarding of the segmented writing trajectory data fails.

18. The system for writing trajectory synchronization among multiple clients according to claim 10, wherein the computer processor is further to record the complete writing trajectory data associated with a single complete writing input captured at each transmitting end, and transmitting the complete writing trajectory data to a newly added receiving end to insert the single complete writing input into the interface for display.

* * * * *